(12) United States Patent
Katayama (10) Patent No.: US 8,030,883 B2
(45) Date of Patent: Oct. 4, 2011

(54) HYBRID CONTROL DEVICE

(75) Inventor: Junta Katayama, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 445 days.

(21) Appl. No.: 12/162,249

(22) PCT Filed: Jan. 17, 2007

(86) PCT No.: PCT/JP2007/051030
§ 371 (c)(1),
(2), (4) Date: Jul. 25, 2008

(87) PCT Pub. No.: WO2007/086388
PCT Pub. Date: Aug. 2, 2007

(65) Prior Publication Data
US 2009/0015205 A1    Jan. 15, 2009

(30) Foreign Application Priority Data
Jan. 27, 2006    (JP) ................................ 2006-018674

(51) Int. Cl.
*H02J 7/14* (2006.01)
*H02J 7/16* (2006.01)
*H02J 7/00* (2006.01)

(52) U.S. Cl. ...................... 320/104; 320/150; 320/134

(58) Field of Classification Search ................... 320/104, 320/150
See application file for complete search history.

(56) References Cited

U.S. PATENT DOCUMENTS

| | | | |
|---|---|---|---|
| 6,204,639 B1 * | 3/2001 | Takano et al. ................. | 320/150 |
| 6,232,743 B1 * | 5/2001 | Nakanishi ..................... | 320/104 |
| 6,377,880 B1 * | 4/2002 | Kato et al. ..................... | 701/29 |
| 6,380,717 B2 * | 4/2002 | Murakami et al. ............ | 320/150 |
| 2005/0168180 A1 | 8/2005 | Minekawa et al. | |
| 2007/0018608 A1 * | 1/2007 | Okumura ....................... | 320/104 |

FOREIGN PATENT DOCUMENTS

EP    1 504 949 A1    2/2005
(Continued)

OTHER PUBLICATIONS

Ahmad A. Pesaran, "Battery Thermal Models for Hybrid Vehicle Simulations", Journal of Power Sources, Aug. 22, 2002, pp. 377-382, vol. 110, No. 2.

Chanwoo Park, et al, "Reciprocating Battery Cooling for Hybrid and Fuel Cell Vehicles", Proceedings of IMECE'03, 2003 ASME International Mechanical Engineering Congress, Nov. 15-21, 2003, pp. 425-430, vol. 43.

(Continued)

*Primary Examiner* — M'Baye Diao
(74) *Attorney, Agent, or Firm* — Sughrue Mion, PLLC (57) ABSTRACT

In a hybrid control device performing cooling control of a secondary battery of a hybrid vehicle, the hybrid control device limiting the amount of charge/discharge of the secondary battery based on an air volume flow of a cooling fan cooling the secondary battery, an operation control mode of the secondary battery cooling fan is changed from an ordinary control mode to a power mode in which an air volume flow of the cooling fan is larger than in the ordinary control mode, whereby a limiting value of the amount of charge/discharge of the secondary battery is varied to expand the usable range of the secondary battery. Accordingly, when improvement of drive power performance is desired by an operator more than low noise within the vehicle, the amount of charge/discharge of the secondary battery is not limited by the cooling fan, and larger drive power performance is thus achieved.

3 Claims, 7 Drawing Sheets

FOREIGN PATENT DOCUMENTS

| | | |
|---|---|---|
| JP | 7-73906 A | 3/1995 |
| JP | 11-285106 A | 10/1999 |
| JP | 2004-48981 A | 2/2004 |
| JP | 2005-94928 A | 4/2005 |

OTHER PUBLICATIONS

European Office Action for European Application No. 07 707 281.7-2207 dated Mar. 3, 2011.

* cited by examiner

HYBRID CONTROL DEVICE

TECHNICAL FIELD

The present invention relates to a hybrid control device performing cooling control of a secondary battery installed in a hybrid vehicle.

BACKGROUND ART

Hybrid vehicles using drive power obtained from a motor generator as vehicle propulsion power are commonly provided with a rechargeable (chargeable/dischargeable) secondary battery used during operation. Electric power accumulated in this secondary battery is converted into drive electric power by an inverter circuit and then extracted to drive the above motor generator, while the secondary battery is charged by the generated electric power. Since such a secondary battery has an internal resistance, charge/discharge involves heat generation. Accordingly, as charge/discharge of the secondary battery is repeated, the temperature of the secondary battery rises.

Also, generally, continuous use of such a secondary battery in a high-temperature state contributes to shortening of the life of the battery. Accordingly, in order to protect the secondary battery, charge/discharge current is limited when the temperature of the secondary battery is high. As a result, sufficient vehicle propulsion power cannot be obtained, and, in a case of a hybrid vehicle, the fuel mileage is reduced.

Figure 7:
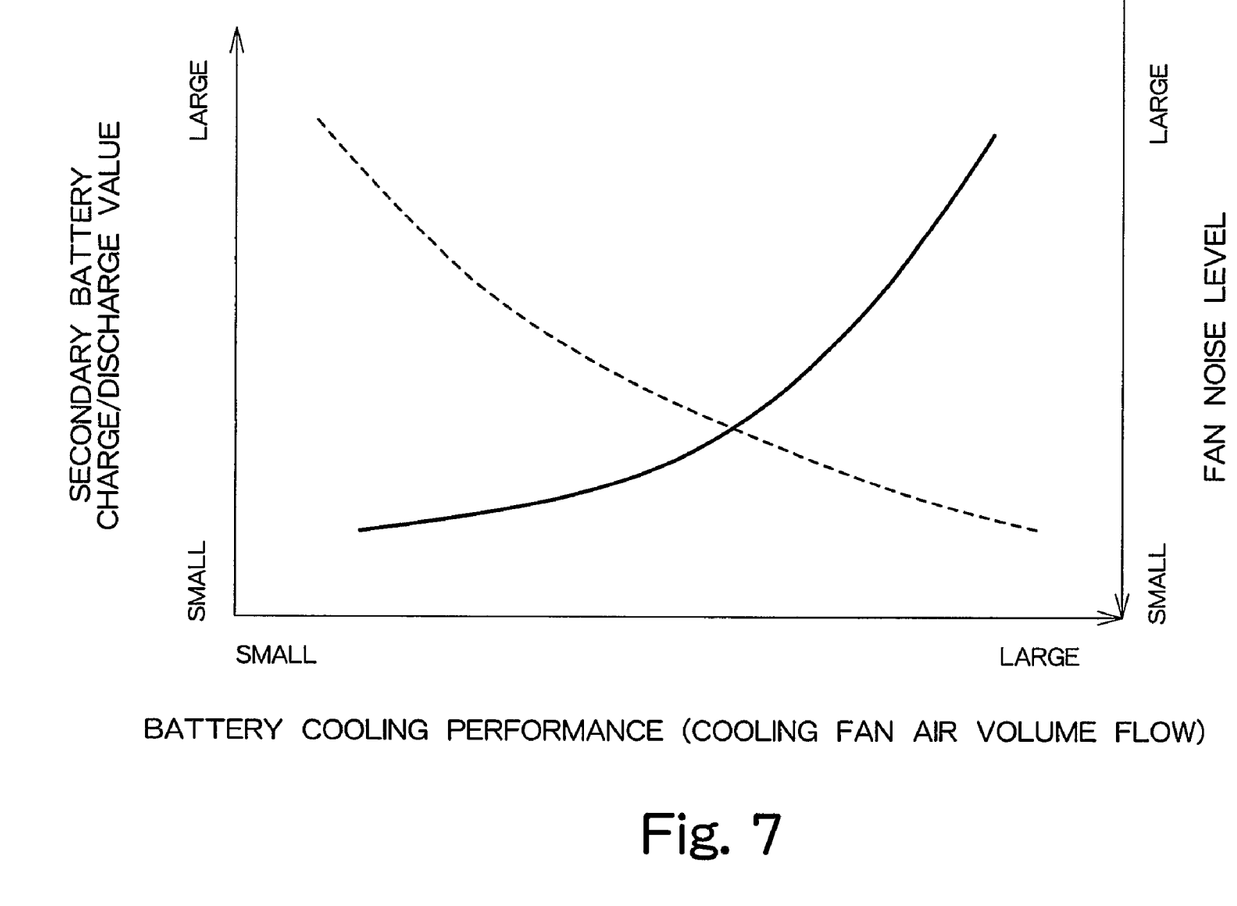
FIG. 7 is an explanatory view illustrating a relationship between the amount of charge/discharge of secondary battery and fan noise level and battery cooling performance (cooling fan air volume flow).

In consideration of this problem, hybrid vehicles are commonly provided with a cooling fan for cooling the secondary battery. Generally, as the charge/discharge current of secondary battery increases, the rise of temperature of secondary battery becomes larger. Accordingly, as illustrated in FIG. 7, as the amount of charge/discharge of secondary battery increases, a larger cooling air volume flow is required.

Figure 6:
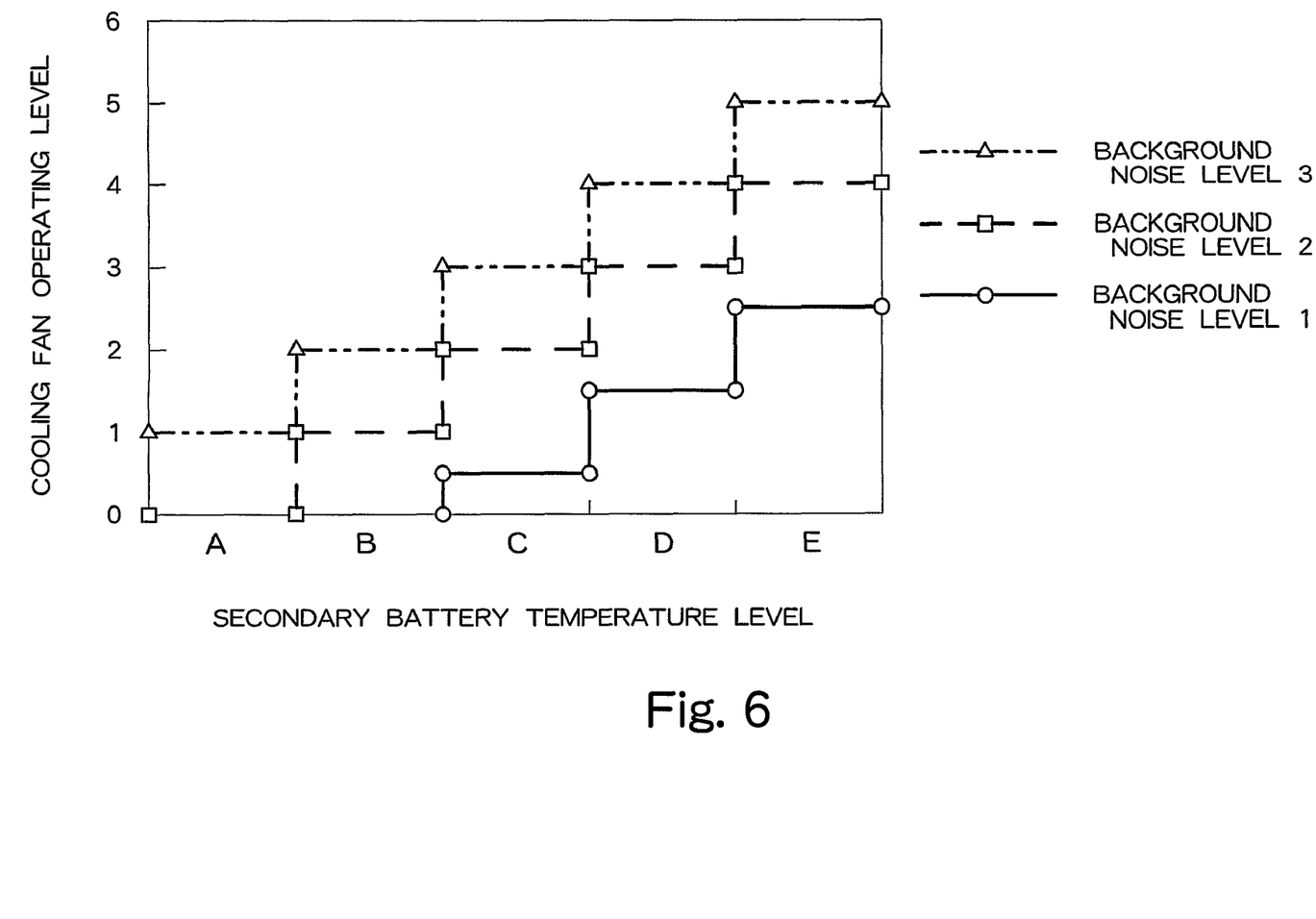
FIG. 6 is a view illustrating a relationship between secondary battery temperature level and cooling fan operating level at each background noise level according to conventional art.

On the other hand, in a hybrid vehicle, generally, when the vehicle interior background noise is kept at a low level, such as while parking or running at a low speed, the amount of charge/discharge of secondary battery is also small, so only small air volume flow of cooling fan is required; when the vehicle interior background noise is large, such as running at a high speed, the amount of charge/discharge of secondary battery is also large. Thus, in Japanese Patent Laid-Open Publication No. 2004-48981, there has been proposed a control device which, as illustrated in FIG. 6, performs control of reducing cooling air volume flow according to the line of background noise Level 1 when the vehicle interior background noise is low while running at a low speed, and of increasing air volume flow according to the line of vehicle interior background noise Level 2 or 3 when the vehicle interior background noise is high while running at a high speed, and thereby cools effectively the secondary battery without increasing recognized noise from cooling fan. Also, as the temperature level of the secondary battery increases, a larger cooling air volume flow is required for the secondary battery. Thus, in Japanese Patent Laid-Open Publication No. 2004-48981, there has also been proposed a technique in which, as illustrated in FIG. 6, control is performed so as to increase the air volume flow of secondary battery cooling fan as the temperature level of secondary battery rises.

However, according to the above-noted secondary battery cooling control, when a rapid change from a low-speed running state to acceleration is desired, since the air volume flow of cooling fan has been suppressed low in the interest of noise within vehicle, there arises a problem that the amount of charge/discharge of secondary battery is limited to prevent an excessive rise of secondary battery temperature and thus an output required for acceleration cannot be obtained from the motor generator. Particularly, when "sporty" driving is desired, such as on a mountain road or the like, there arises a problem that it is sometimes impossible to achieve sufficient acceleration performance as a result of the control suppressing the cooling fan noise. On the other hand, improvement of drive power performance is sometimes desired by an operator more than low noise within the vehicle.

In consideration of this, the present invention advantageously provides a control device capable of achieving larger drive power performance without causing a cooling fan to limit the amount of charge/discharge of secondary battery when an operator values improvement of drive power performance higher than reduction of noise within the vehicle.

DISCLOSURE OF THE INVENTION

According to the present invention, there is provided a hybrid control device performing cooling control of a secondary battery of a hybrid vehicle, the hybrid control device limiting the amount of charge/discharge of the secondary battery based on an air volume flow of a cooling fan cooling the secondary battery, wherein an operation control mode of the secondary battery cooling fan is changed from an ordinary control mode to a power mode in which an air volume flow of the cooling fan is larger than in the ordinary control mode, whereby a limiting value of the amount of charge/discharge of the secondary battery is varied to expand the usable range of the secondary battery. Here, the amount of charge/discharge of the secondary battery may be limited based on a temperature level of the secondary battery and an air volume flow of the cooling fan cooling the secondary battery, or, alternatively, a change to the power mode may be made when the accelerator opening exceeds a predetermined value.

Accordingly, when improvement of drive power performance is desired by the operator more than low noise within the vehicle, the amount of charge/discharge of secondary battery is not limited by the cooling fan, thereby improving drive power performance.

BEST MODE FOR CARRYING OUT THE INVENTION

Figure 1:
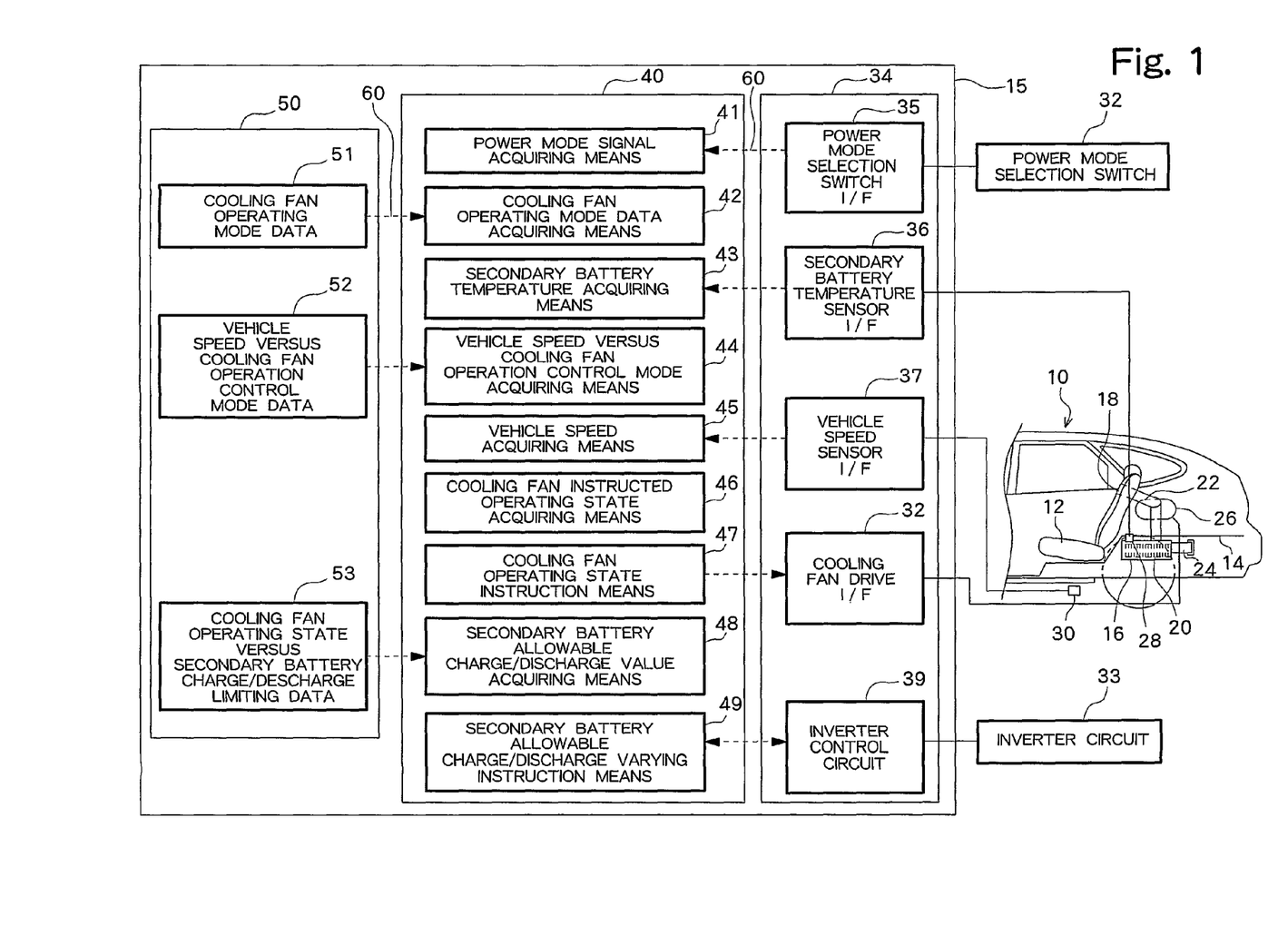
FIG. 1 is a configuration diagram of a control device according to an embodiment of the present invention.

FIG. 1 is a view illustrating a configuration of a hybrid control device 15 according to the present invention. As illustrated in FIG. 1, a secondary battery 16 is installed in a lower backside of a rear seat 12 in a vehicle 10. The secondary battery 16 is constituted by a predetermined number of battery modules 20 connected in series to realize a high-voltage output of 200 V to 300 V, each battery module being constituted by a plurality of (for example, six) single cells (for example, battery cells having an output voltage of 1.2 V) connected and integrally joined so as to obtain a required electric power capacity (voltage value). Between these battery modules 20, there are formed respective air paths for cooling. Cooling air of the secondary battery 16 flows from an air intake 18 arranged in the side of the rear seat 12 to an air intake duct 22 and is introduced to a cooling fan 26 and pressurized by the cooling fan 26 and thereafter forced into the secondary battery 16. The cooling air forced into the secondary battery 16 flows through a gap between the battery modules 20 to cool the battery modules 20 and is then discharged through an air exhaust duct 24 to the outside of the vehicle 10. The secondary battery 16 is provided with a secondary battery temperature sensor 28 for measuring a secondary battery temperature and the vehicle 10 is provided with a vehicle speed sensor 30 measuring the vehicle speed. An output of a speedometer of the vehicle 10 may be used instead of the vehicle speed sensor. In the vehicle, there is arranged an inverter circuit 33 for driving a motor generator. Further, in the vehicle, there is installed a power mode selection switch 32 for the operator to give instructions on whether or not to select a power mode.

The hybrid control device 15 comprises a control unit 40 performing a signal processing and calculation; a storage unit 50 storing control data such as control curve; an interface unit 34 for interfacing with each hardware unit; and a data bus 60 connecting each unit.

The interface unit 34 includes a power mode switch interface 35 converting an input from the power mode selection switch 32 into an input signal to the control unit 40; a secondary battery temperature sensor interface 36 converting an input from the secondary battery temperature sensor 28 into an input signal to the control unit 40; a vehicle speed sensor interface 37 converting an input signal from the vehicle speed sensor 30 into an input signal to the control unit 40; a cooling fan drive interface 38 converting a drive instruction signal for the cooling fan 26 from the control unit 40 into a drive instruction output to the cooling fan 26; and an inverter control circuit 39 outputting a signal of controlling the inverter circuit 33 according to an instruction signal from the control unit 40.

Figure 3:
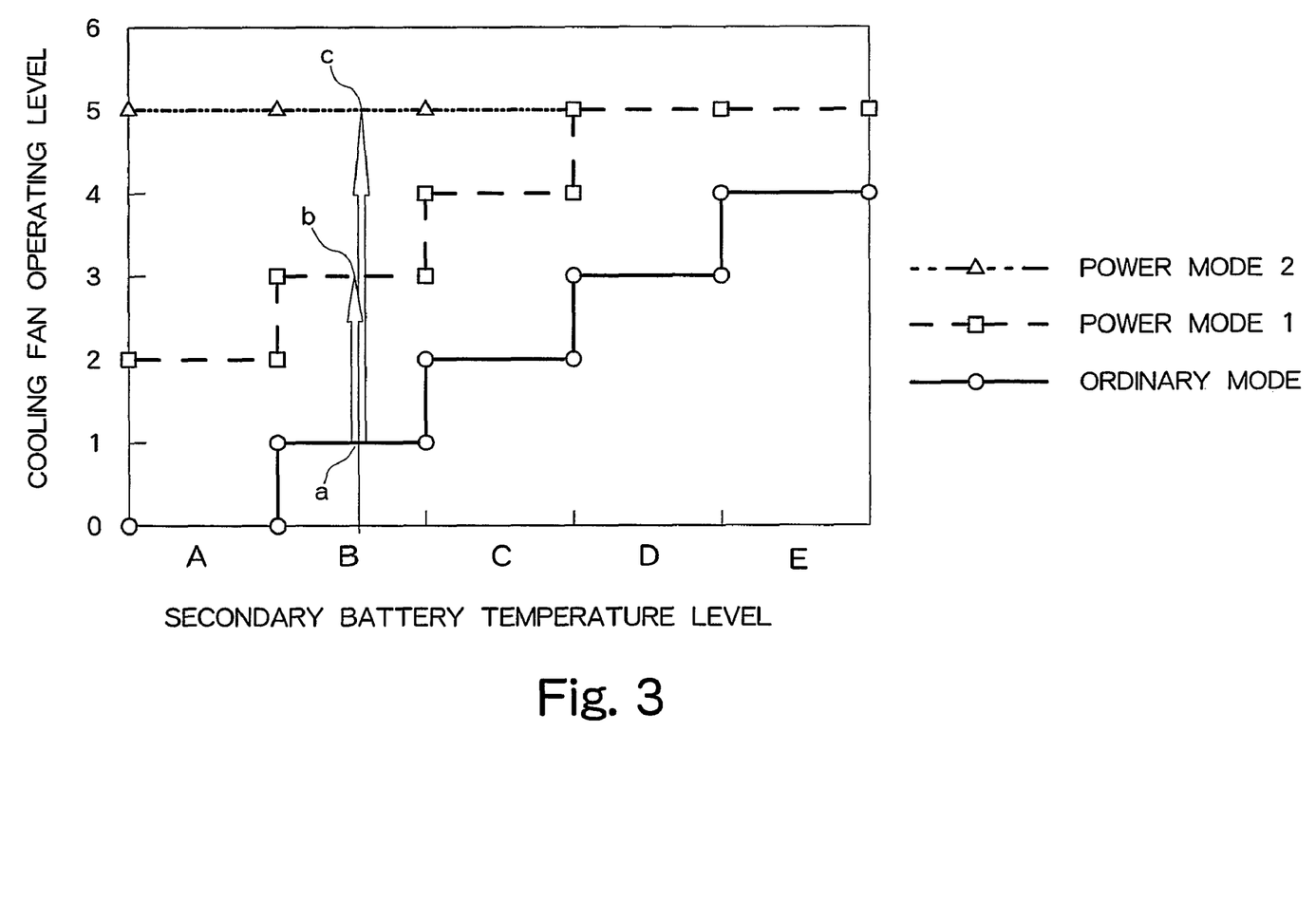
FIG. 3 is a view of cooling fan operating mode data according to the embodiment of the present invention, illustrating a relationship between secondary battery temperature level and cooling fan operating level in an ordinary mode and a power mode.
Figure 4:
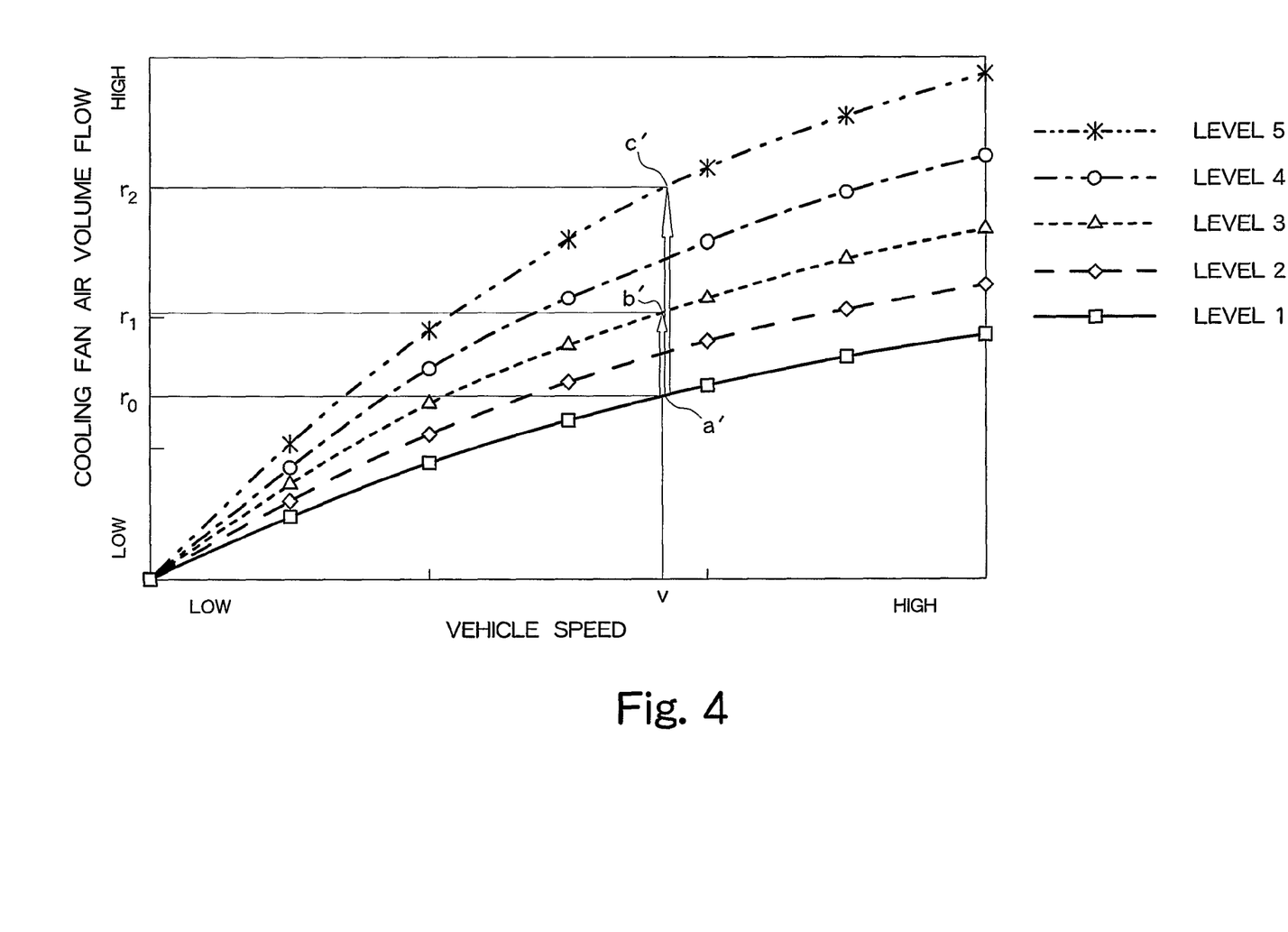
FIG. 4 is a view of cooling fan air volume flow limiting curve data with respect to vehicle speed according to the embodiment of the present invention, illustrating a relationship between vehicle speed and cooling fan instructed air volume flow in each cooling fan operating mode.
Figure 5:
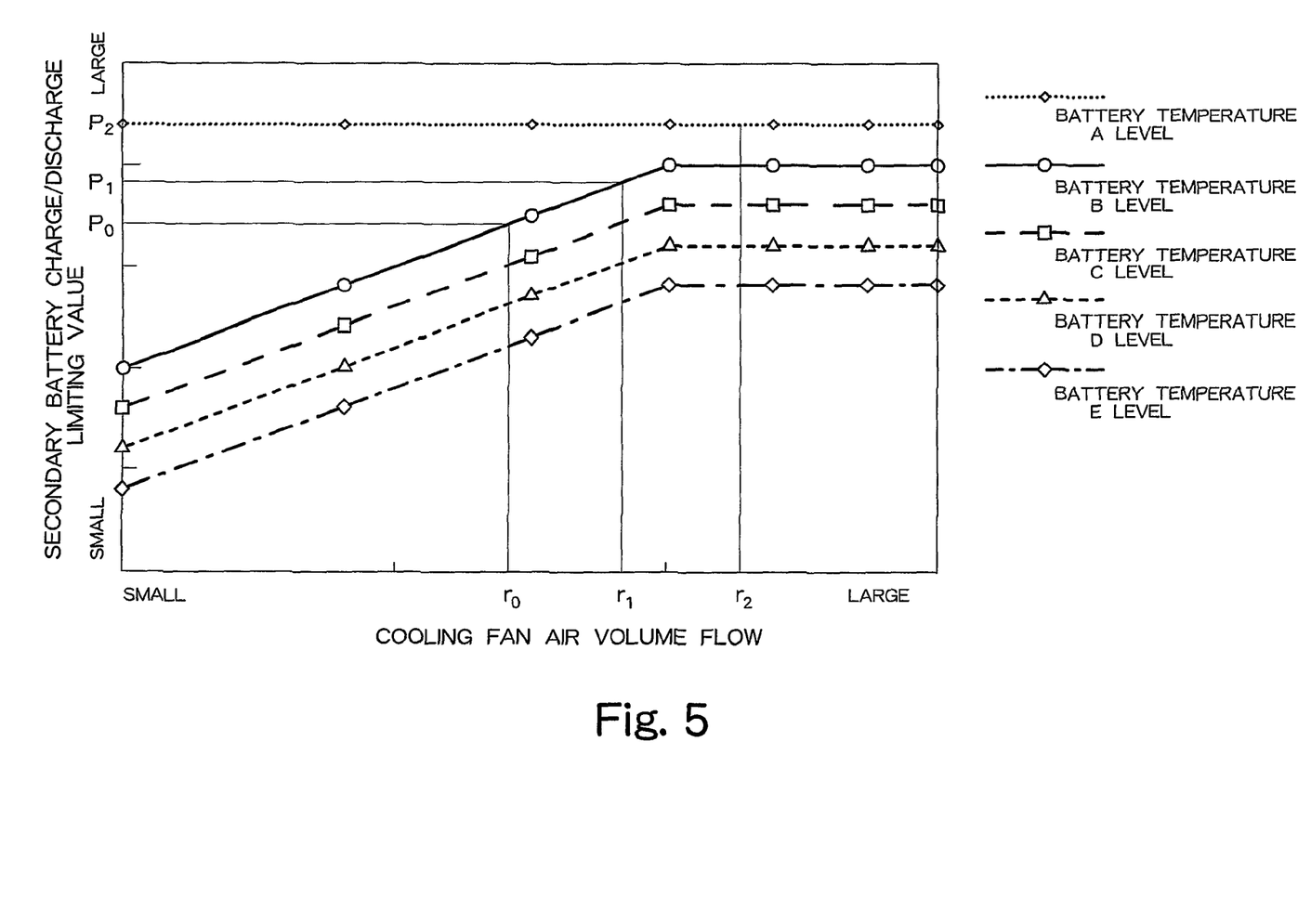
FIG. 5 is a view of secondary battery charge/discharge limiting curve data with respect to cooling fan operating state according to the embodiment of the present invention, illustrating a relationship between cooling fan air volume flow and a secondary battery charge/discharge limiting value.

The storage unit 50 stores cooling fan operating mode data 51 indicating the secondary battery temperature level and the cooling fan operation control level of FIG. 3; vehicle speed versus cooling fan operation control mode data 52 being vehicle speed versus cooling fan air volume flow control curve data illustrated in FIG. 4; and cooling fan operating state versus secondary battery charge/discharge limiting data 53 being data of the cooling fan air volume flow and the secondary battery charge/discharge limiting curve as illustrated in FIG. 5.

The control unit 40 includes power mode signal acquiring means 41 for acquiring a signal from the power mode selection switch 32; cooling fan operating mode data acquiring means 42 for acquiring data from the cooling fan operating mode data 51; secondary battery temperature acquiring means 43 for acquiring a signal from the secondary battery temperature sensor 28; vehicle speed versus cooling fan operation control mode acquiring means 44 for acquiring data from the vehicle speed versus cooling fan operation control mode data 52; vehicle speed acquiring means 45 for acquiring a vehicle speed; cooling fan operation instructed operating state acquiring means 46 for acquiring an instructed operating state of the cooling fan 26 from the acquired vehicle speed; cooling fan operating state instruction means 47 for generating a drive instruction signal to the cooling fan 26; secondary battery allowable charge/discharge value acquiring means 48 for acquiring charge/discharge limiting data from the cooling fan operating state versus secondary battery charge/discharge limiting data 53; and secondary battery charge/discharge varying instruction means 49 for varying the value for the secondary battery allowable charge/discharge and generating the value to the inverter control circuit.

An example of operation of the hybrid control device 15 described above will next be described with reference to FIGS. 2 to 5.

Figure 2:
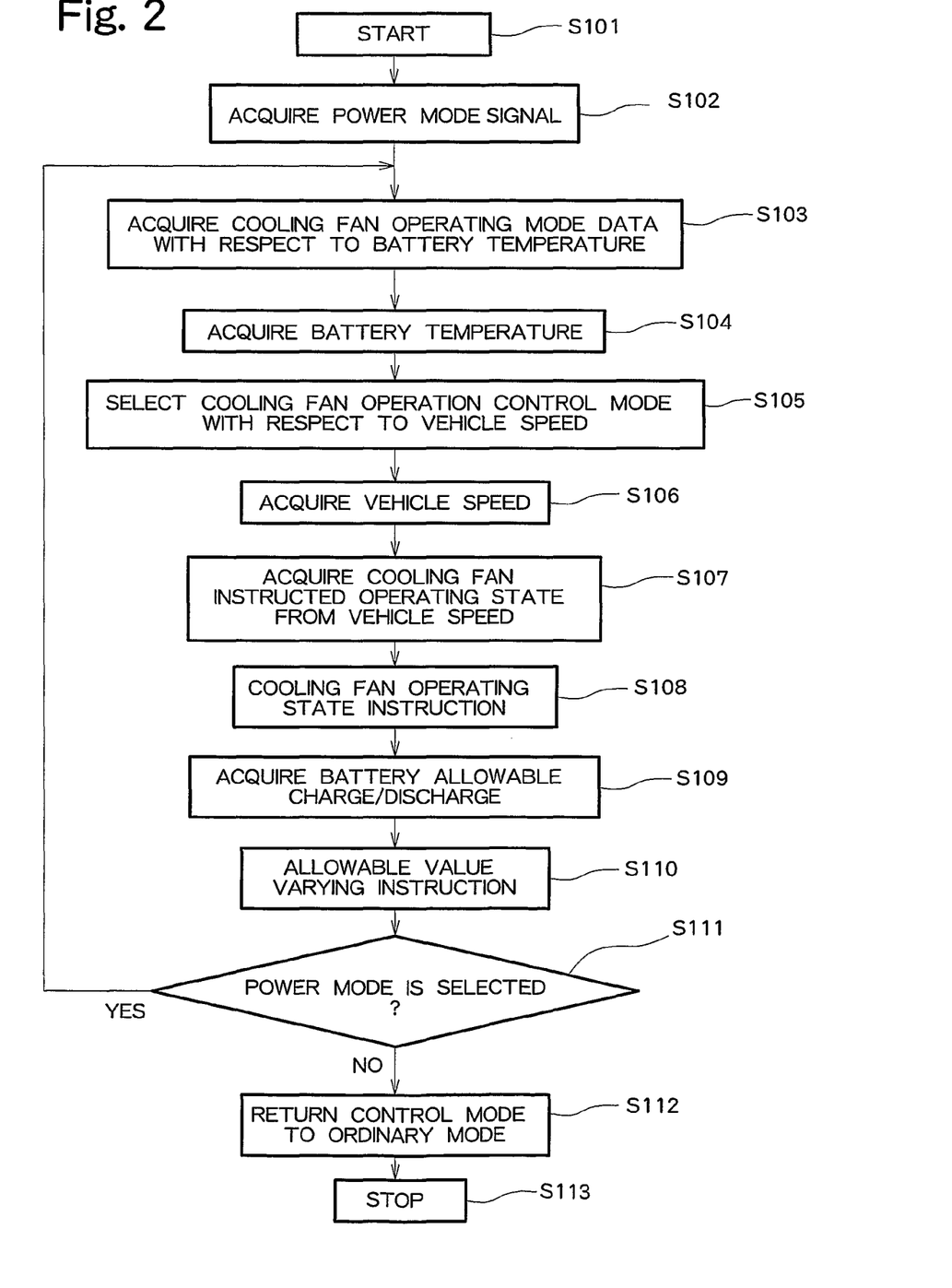
FIG. 2 is a flowchart illustrating the operation of the control device according to the embodiment of the present invention.

The control unit 40 acquires a power mode selection signal from the power mode selection switch 32 and then acquires, based on the selected power mode, an operating mode from the cooling fan operating mode data 51 stored in the storage unit 50 (FIG. 2, step S102 to S103).

As illustrated in FIG. 3, the cooling fan operating mode data 51 is data defining the relationship between the temperature level of each secondary battery and the operating level of the cooling fan 26 in each operating mode; the temperature of the secondary battery 16 rises from temperature level A to temperature level E, and the operating level of the cooling fan 26 having a larger number indicates larger air volume flow. In the ordinary mode, when the temperature level of the secondary battery 16 is at the lowest level A, the cooling fan 26 is not activated, and as the temperature of the secondary battery 16 rises from A to E, the operating level (air volume flow) of the cooling fan 26 increases stepwise from Level 1 to Level 4. Here, when Power Mode 1 is selected by the operator, the operating mode is changed to one based on the control line of Power Mode 1 indicated with square mark in FIG. 3. In Power Mode 1, the operating level (air volume flow) of the cooling fan 26 is increased by two levels in each temperature range (A to D) of the secondary battery 16, compared to the ordinary mode; in this mode, when the temperature of the secondary battery 16 is at level E, the cooling fan 26 is operated at level 5 being a maximum operating level of the cooling fan 26. Accordingly, in Power Mode 1, even when the temperature level of the secondary battery 16 is the lowest level A, the cooling fan 26 is operated at Level 2, and as the temperature of the secondary battery 16 rises from A to E, the operating level (air volume flow) of the cooling fan 26 increases stepwise from Level 2 to level 5 and at the same time, the noise of the cooling fan 26 also increases. Also, when Power Mode 2 is selected by the operator, the cooling fan 26 is operated at all times at the maximum operating level 5 irrespective of the temperature of the secondary battery 16.

Subsequently, the control unit 40 acquires a secondary battery temperature as a signal from the secondary battery temperature sensor 28 (FIG. 2, step S104) and then, based on the acquired cooling fan operating level, selects a curve of vehicle speed versus cooling fan air volume flow illustrated in FIG. 4 from the vehicle speed versus cooling fan operating mode data (FIG. 2, step S105). Then, the control unit 40 acquires a vehicle speed data signal as an input from the vehicle speed sensor 30 (FIG. 2, step S106). From the acquired vehicle speed and the selected curve, an instructed operating state of the cooling fan 26 is acquired (FIG. 2, step S107).

When the operator selects Power Mode 1 at a time when the temperature level of the secondary battery 16 is at level B, the operating level of the cooling fan 26 is changed from Level 1 at the ordinary mode to Level 3 (FIG. 3, from point a to point b). On the other hand, the relationship between the vehicle speed and the air volume flow of the cooling fan 26 is defined, as illustrated in FIG. 4, for each cooling fan operating level. Here, at operating Level 1 in the ordinary mode, control is performed according to the line of Level 1 indicated with square mark in FIG. 4; when the operating level is changed to 3 in the power mode, the relationship between speed and cooling air volume flow is controlled according to the line of Level 3 indicated with triangular mark in FIG. 4. Accordingly, when the vehicle speed acquired from the vehicle speed sensor 30 is V, the instructed air volume flow of the cooling fan 26 is changed from $r_0$ for the ordinary mode to $r_1$ for the power mode (FIG. 4, from point a' to point b'). Similarly, when Power Mode 2 is selected, the operating level of the cooling fan 26 is changed to level and thus point c' of FIG. 4 indicates the instructed air volume flow of the cooling fan 26.

The control unit 40 generates a cooling fan operating state instruction for raising the rotational speed of the cooling fan 26 so that the instructed air volume flow of the cooling fan 26 is achieved (FIG. 2, step S108). The cooling fan drive interface 38 outputs according to this instruction signal an output for raising the rotational speed of the cooling fan 26 to the cooling fan 26. As described above, when the power mode selection switch 32 is selected, the rotational speed of the cooling fan 26 becomes larger than the ordinary number of rotations per unit time, and thus the volume flow of the air impelled by the cooling fan 26 increases.

When the air volume flow impelled by the cooling fan 26 increases, the control unit 40 acquires the secondary battery charge/discharge limiting value corresponding to the air volume flow of the cooling fan 26 from the cooling fan operating state versus secondary battery charge/discharge limiting data 53, and generates an instruction of varying the secondary battery charge/discharge limiting value to the inverter control circuit 39. The inverter control circuit varies the charge/discharge limiting value of the inverter circuit to permit a larger current to flow (FIG. 2, step S109 to S110).

As illustrated in FIG. 5, the charge/discharge limiting value of the secondary battery 16 is $P_0$ when the instructed air volume flow of the cooling fan 26 is $r_0$ for the ordinary mode, but changed to $P_1$ corresponding to instructed air volume flow $r_1$ of the cooling fan when Power Mode 1 is selected. In this manner, the charge/discharge limiting value of the secondary battery 16 is increased, so the motor generator output is prevented from being limited by the operating state of the cooling fan 26 during powerful running. Further, when Power Mode 2 is selected, the charge/discharge limiting value of the secondary battery 16 is changed to $P_2$ corresponding to instructed air volume flow $r_2$ of the cooling fan 26. $P_2$ is a maximum charge/discharge limiting value at a lowest temperature, being a limiting value which cannot be exceeded. Accordingly, when Power Mode 2 is selected, the secondary battery charge/discharge limiting value is raised to the maximum value, so the motor generator output is also prevented from being limited by the cooling fan air volume flow.

The control unit 40 monitors at all times whether or not the power mode has been selected, and returns the control mode to the ordinary mode when the power mode has not been selected (step S111 to step S113).

As described above, according to the present embodiment, there is achieved an advantageous effect that, when a power mode is selected using the power mode selection switch 32 because, for example, improvement of drive power performance is more desired by the operator than reducing noise within the vehicle, the amount of charge/discharge of the secondary battery 16 is not limited by the cooling fan 26, and a larger drive power performance is achieved.

According to the embodiment of the present invention, to perform control in each mode, the operator selects, by use of the power mode selection switch 32, Power Mode 1 or Power Mode 2 in which the charge/discharge limiting value of the secondary battery 16 further increases. However, a configuration may be used such that one power mode is automatically selected from among several power modes based on the operating state of vehicle, such as accelerator opening, acceleration, or geographical information provided by a navigation system.

The invention claimed is:

1. A hybrid control device performing cooling control of a secondary battery of a hybrid vehicle, the hybrid control device limiting the amount of charge/discharge of the secondary battery based on an air volume flow of a cooling fan cooling the secondary battery, wherein an operation control mode of the secondary battery cooling fan is changed from an ordinary control mode to a power mode in which an air volume flow of the cooling fan is larger than in the ordinary control mode, whereby a limiting value of the amount of charge/discharge of the secondary battery is varied to expand the usable range of the secondary battery.

2. The hybrid control device according to claim 1, wherein the amount of charge/discharge of the secondary battery is limited based on a temperature level of the secondary battery and an air volume flow of the cooling fan cooling the secondary battery.

3. The hybrid control device according to claim 1, wherein a change to the power mode is made when the value of the accelerator opening is greater than or equal to a predetermined value.

* * * * *